United States Patent Office 2,810,647
Patented Oct. 22, 1957

2,810,647

PROCESS OF PREPARING FIBER FROM PITH-CONTAINING PLANT MATERIALS

Thomas R. McElhinney, New Orleans, La., assignor to Valite Corporation, New Orleans, La., a corporation of Louisiana No Drawing. Application December 21, 1954, Serial No. 476,838

42 Claims. (Cl. 92—14)

The present application relates to a process of making pulp from pith-containing fibrous plant materials and to a product obtained from such process and is a continuation-in-part of my allowed copending application Serial No. 237,690, now abandoned, and my allowed copending application Serial No. 221,945, now abandoned, which is a continuation-in-part of my application Serial No. 21,303, allowed June 15, 1951, now abandoned, the latter being a continuation-in-part of my application Serial No. 631,210, filed November 27, 1945, now abandoned. The application also is a continuation-in-part of my allowed copending application Serial No. 227,123, which, in turn, is a continuation-in-part of my application Serial No. 631,209, allowed May 17, 1951, now both abandoned. The application further is a continuation-in-part of my allowed application Serial No. 631,210, allowed May 17, 1951, now abandoned. The disclosures of all and each of the aforesaid applications are hereby incorporated in their entirety as a part of the disclosure of this application.

While the invention is particularly valuable in obtaining pulps from sugar cane bagasse and cornstalks, it is also useful in connection with various other pith-containing reeds and grasses, of which there are a large variety. The pulps obtained by the operation of the process are useful for the manufacture of boards, and both coarse and fine papers.

The primary object of this invention is to treat the pith-containing materials by a process in which the ligneous encrustations are removed without substantially degrading the cellulose contained in the pith, the same being recovered in high yield.

It is well known that sugar can bagasse and cornstalks, as they are available to the industry, consist of a mixture of hard horny outer fiber bundles surrounding an inner core of light and fluffy pith. It has been contended that a pulping solution of sufficient strength to dissolve the ligneous encrusting material from the outer fiber will, of necessity, be so strong that it will have a too drastic effect on the pith portion of the plant material.

It is necessary to point out that while the physical structure of the outer fiber and inner core of pith-containing fibrous plant materials are quite different, the chemical compositions of the two portions are practically identical. Also, lignin, the major constituent of the encrusting material surrounding the cellulose fiber, combines with alkalies to form a water-soluble substance at any concentration of the alkali. On the other hand, I find that while the cellulose in the pith is seriously degraded by conventional hot alkaline solutions containing in the order of 1% or more of active sodium hydroxide, it is not materially affected at concentrations of 0.2% or less.

In the case of pith-containing fibrous plant materials, a conventional pulping liquor containing sufficient sodium hydroxide to render all the lignin present soluble and removable, will first penetrate the pith portion of the plant material and remove the lignin from this portion long before it has begun to penetrate the outer fibers. This being the case, it follows that the residual active alkali, being present in concentrations above the critical point at which the attack on cellulose begins, will immediately attack and degrade the cellulose freed from the pith. This results not only in a lower yield of pulp, but also causes a loss of strength in the finished paper and consumes an undue amount of chemicals.

For the purposes of this invention, the pith-containing plant materials may be designated as either sugar cane bagasse or cornstalks, both of which are composed of a hard, horny outer fibrous shell surrounding a core of porous pith and this invention is only intended to relate to those plant materials wherein the pith portion constitutes above 20% by weight of the whole plant material.

I have found that pulps suitable for coarse products such as boards, corrugating and wrapping papers, as well as bleachable pulps suitable for making fine papers, can be obtained from pith-containing fibrous plant materials by observing certain critical conditions. That is, no substantial degradation of the cellulose in the pith results by carrying out the digestion process of my invention with hot alkaline liquor when sodium hydroxide solution is introduced into the digestion liquor at such a rate that the total quantity of active sodium hydroxide in the digestion liquor at any time never exceeds about .1% and preferably never exceeds about .06% of the weight of the digestion liquor. When this step is carried out until an amount of sodium hydroxide equal to at least about 4% of the weight of the material has been consumed, and preferably about 7.5 to 8.6%, the pulp is highly useful in the manufacture of boards and certain types of coarse papers suitable for corrugating and wrapping purposes. For the manufacture of fine quality papers, a bleachable pulp is obtained containing the cellulose of the pith in substantially undegraded condition where sodium hydroxide is introduced to the hot alkaline digestion liquor at such a rate that the total quantity of active sodium hydroxide in the digestion vessel at any time never exceeds about .1% of the weight of the digestion liquor until an amount of sodium hydroxide equivalent to at least about 7.5% to 8.6% of the weight of material has been consumed. At this point I find that the hard outer fiber bundles have been softened and opened so as to be readily penetrated by the liquor, and since the lignin encrustations are now more completely exposed, it is possible to introduce sodium hydroxide at an increasing rate without danger of degrading the cellulose of the pith. Of course, the operation could be continued using .1% or less sodium hydroxide solution, but it is advantageous to use an increased amount since the process is materially speeded up. Therefore, after about 7.5% to 8.6% of sodium hydroxide has been consumed, the digestion is continued by introducing the sodium hydroxide solution into the hot digestion liquor at a rate such that the total quantity of active sodium hydroxide in the digestion vessel at any time never exceeds about .2% of the weight of the digestion liquor until about 15% to 25% sodium hydroxide, based on the weight of the material, has been consumed; a further expenditure of sodium hydroxide appears to produce no beneficial results.

The digestion with hot alkaline caustic liquor in accordance with this invention may be carried out in an open vessel, but is preferably conducted in the usual conventional closed type of digester, e. g., rotating type. The temperature of the digestion liquor will vary from about that at which the digestion liquor boils at atmospheric pressure to about 338° F. or 100 p. s. i. The approximate amount of total sodium hydroxide which is consumed is usually determined by the character and condition, e. g., old or fresh, of the pith-containing material being processed or digested. The closed type of digester in which live steam is introduced is preferred because it is more rapid.

The effect of a treatment under the critical conditions above-described is to solubilize the lignin without, however, substantially degrading the cellulose in the pith and tests have shown that the original alpha cellulose content of the pith is recovered substantially completely.

The concentration of the sodium hydroxide solution introduced to the hot alkaline liquor is not critical so long as the critical conditions above-outlined are maintained.

It is preferable to carry out the pulping operation with the liquor always at a pH on the alkaline side. In this connection, in some cases, the fibers, before being subjected to digestion, are hydrolyzed in the conventional manner as by treatment with sulfuric acid to destroy pentosans or by a treatment in a closed rotating digester with water and live steam. This is particularly useful in producing a high yield of high alpha cellulose pulp.

This invention also relates to a process and products thereof obtained by treating pith-containing plant materials such as sugar cane bagasse and cornstalks for the preparation of fibers suitable for use in the manufacture of paper boards, insulating boards and hard, pressed boards.

The process further comprises digestion of pith-containing plant materials with lime wherein reaction conditions are so controlled that the hard, outer fiber bundles of the pith-containing plant materials are softened sufficiently to permit easy separation into individual fibers without at the same time destroying the more easily digested inner pith portion.

A further object of the invention is the preparation of insulating boards and hard, pressed boards having lower specific gravities then corresponding boards made from pulps prepared by other methods.

By my method of digestion both outer fibers and the central pith portion of the bagasse are digested to the same degree and subsequent beating and refining processes hydrate both portions equally, with the result that intimate mixture occurs throughout the board-forming process. The final product of the board machine is therefore substantially uniform throughout its entire cross section. Inclusion of the pith in this manner substantially reduces the weight of finished boards without accompanying loss of strength.

If sufficient alkaline chemical to remove or soften all the ligneous encrusting material in the bagasse or other pith-containing fiber is placed in the digester at the beginning of the digestion, it is apparent that the cellulose separate from the pith portion is exposed, almost immediately, to a strong alkaline solution and that chemicals placed in the digester to combine with lignin will, instead, attack the exposed cellulose, since only the outer surface of the hard outer fiber bundles is yet exposed. This results, not only in a loss of valuable product, but also the use of excessive amounts of chemical, since once the degradation of cellulose is started it progresses rapidly. Lignin, however, forms definite reaction products with alkalies and will react with them when they are present in very small quantities, proceedings from a reaction state or from where it is first easily penetrated by, but not soluble in, water to a final form where it is completely soluble.

For use in building board, only the first state is necessary, and I have found means to produce this state in all the ligneous matter in the bagasse without causing any parallel degradation in the cellulose of the pith. Essentially, the process consists of adding alkaline reagents to bagasse in a digester at the exact rate of consumption by the ligneous matter in the digester. Control of the process where lime is ued for the reagent is best accomplished by digestion at a constant pH value in the pulping liquor. I have found that if pH values in pulping liquors are held at between about 7.5 and 9.0, measured at substantially room temperature and pressure, little or no degradation of cellulose will occur and that lime can be added and pulping will proceed at satisfactory rates. I have found that under these conditions, a pulp suitable for use in paper boards can be produced with lime consumption as low as 3% by weight of the original bagasse and as high as 20% or 25%. I have also found that I can make pulp by this method with the consumption of less than 8% lime which will be fully as well digested as those produced by common processes using from 15% to 20% lime wherein a rotary digester is loaded with straw or bagasse and the same is cooked in a milk of lime suspension. I have also found that yields from my process are from 5% to 10% higher than the yields from such old processes.

The apparatus used for this process can be of any conventional type. I use either a stationary digester equipped with a circulating system and outside indirect heat exchanger, and means for injecting concentrated lime solution at a rate sufficient to maintain the desired pH in the digestion liquor, or a rotary type digester heated by direct steam. Continuous sampling and automatic pH control can be provided through the use of standard pH controllers and pumps which, as known, automatically force additional quantities of milk of lime into the digester as needed. By the use of such continuous sampling and automatic pH control equipment, the pH is constantly maintained at between about 7.5 and 9.0 measured at room temperature and pressure. By the simplest process, a rotary digester heated with direct steam is used and sampling for pH tests and addition of lime is done at intervals. After experience is gained in the operation of a particular digester, the desired pH value may be maintained within the range of one pH unit, by withdrawing samples at one-half hour intervals, determining the pH by any known method, and adding the necessary amount of lime through a pressure chamber above and connected to the digester.

The digestion with lime wherein the pulping liquor is maintained at a pH between about 7.5 and 9.0 has been successfully carried out at a temperature between about 239° F. and 338° F. corresponding to a gauge pressure between about 10 pounds per square inch gauge and 100 pounds per square inch gauge.

I have also found that satisfactory bleached and unbleached pulps suitable for the manufacture of various grades of papers, boards and board materials and other cellulosic products may be produced by a combination of the aforesaid lime digestion and caustic soda digestion treatments, by observing the critical conditions described and as set forth in the following examples.

EXAMPLES USING SODIUM HYDROXIDE DIGESTION

Example 1

In this example, bagasse, which has been disintegrated by any suitable means, is loaded into a conventional digester of any suitable closed type and covered with water adjusted with sodium carbonate to have a pH well above neutral or black liquor from a previous cook having a pH well on the alkaline side, e. g., pH 11 to 12. Circulation of the liquid in the digester through a heat exchanger is started, and heat is applied to the heat exchanger until the temperature of the contents of the digester reaches a temperature of about 240° F. and 10 p. s. i. gauge. At this point, addition of concentrated sodium hydroxide solution (10 to 50% concentration, preferably about 40%) is commenced and continued at such a rate that the concentration of active sodium hydroxide is maintained at all times not greater than about .1% of the weight of the cooking liquor. These conditions are maintained until about 7.5% sodium hydroxide has been consumed based on the weight of the pith-containing materials. This usually requires about four hours.

It is found that the pulp may be employed for making corrugated board and other coarse papers.

*Example 1a*

This example was the same as Example 1 except that the conditions were maintained until about 8.6% sodium hydroxide has been consumed.

*Example 1b*

This example is the same as Examples 1 or 1a except that the concentration of active sodium hydroxide is maintained at not greater than .1% or .2%.

*Example 2*

The procedure of Example 1 is continued where higher quality pulps are desired until substantially 15 to 25% of sodium hydroxide is consumed. However, instead of adding the sodium hydroxide solution at a rate that the concentration of active sodium hydroxide is maintained at not greater than .1% of the weight of the cooking liquor, it is possible to increase this rate because the fiber bundles at the conclusion of Example 1 are open and soft and readily penetrated by the digestion liquor. I have found that the operation can be considerably speeded up without substantial degradation of the cellulose of the pith by continuing the addition of the sodium hydroxide solution at such a rate that the concentration of active sodium hydroxide is maintained at all times at not greater than about .2% of the weight of the cooking liquor. The conditions are maintained until about 15 to 25% sodium hydroxide is consumed, based on the weight of the pith-containing materials. Where about 20% of sodium hydroxide is consumed, the whole operation takes about eight to nine hours.

*Example 2a*

The procedure of Example 1 is continued where higher quality pulps are desired until substantially 15 to 25% of sodium hydroxide is consumed. However, instead of adding the sodium hydroxide solution at a rate that the concentration of active sodium hydroxide is maintained at not greater than .1% or .2% of the weight of the cooking liquor, it is possible to increase this rate because the fiber bundles at the conclusion of Example 1 are open and soft and readily penetrated by the digestion liquor. I have found that the operation can be considerably speeded up without substantial degradation of the cellulose of the pith by continuing the addition of the sodium hydroxide solution at such a rate that the concentration of active sodium hydroxide is maintained at all times at not greater than about .2% of the weight of the cooking liquor for best results but after the opening up and softening of the fiber bundles, as in Examples 1 and 1a, the procedure of Example 2 may be continued as described, or the concentration of caustic above .2% may be employed, e. g., up to about 0.5%, to speed up the operation but with some degradation of cellulose and with some loss of optimum properties occasioned by the increased concentration of caustic after the initial softening and opening up operation. The conditions are maintained until about 15 to 25% sodium hydroxide is consumed, based on the weight of the pith-containing materials. Where about 20% of sodium hydroxide is consumed, the whole operation takes about eight to nine hours, unless during the second stage, i. e., after softening and opening up of the fibers, the caustic concentration is increased above .2% when the time will be reduced proportionally as indicated.

These pulps are easily bleachable and find a very acceptable use in the manufacture of fine grades of paper.

*Example 3*

Examples 1 to 1b, inclusive, were carried out until about 4%, 5%, 6%, 8%, 9% and 10%, respectively, of sodium hydroxide was consumed. Where less than 7.5% was consumed, the operation required a proportionately greater time for completing the operation and where more than 7.5% was consumed, there was a proportionately decreased time necessary to complete the operation. The pulps obtained were suitable for manufacturing cheap corrugated board materials as well as cheap grades of wrapping paper, depending upon the amounts of sodium hydroxide consumed.

*Example 4*

The operations of Example 2 were carried out in conjunction with Example 3 using pulps which had been prepared by consuming at least 7% caustic soda, based on the weight of the pith-containing materials, and the pulps obtained were bleachable and suitable for the manufacture of finer grades of paper.

*Example 5*

The operations of Examples 1 to 4 were carried out with the digestion liquor at a temperature of 266° F. and 25 p. s. i. gauge, as well as 338° F. and 100 p. s. i. gauge. By increasing the temperature, the speed of the operation is substantially increased in proportion to the increase in temperature

*Example 6*

The operations of Examples 1 to 4 were carried out in an open digester at atmospheric pressure and the digestion liquor was preferably maintained at approximately a boiling temperature or slightly therebelow. The effect of the treatment in the open digester, as will be appreciated, was to increase the time required to complete the operation. In carrying out this example, I observed the necessity for some slight increases in chemical consumption which, however, are negligible.

*Example 7*

In this example the operations of Examples 1 to 6 are applied to pith-containing materials which have been preliminarily hydrolyzed in any suitable manner as by treatment with sulfuric acid. The hydrolysis liquor is drained off and the fibers are then subjected to digestion, as described in the preceding examples. This example is particularly useful in the preparation of alpha cellulose pulps containing a minimum percentage of pentosans. The pentosan content is reduced to 1% or less.

While I have referred herein to introducing the digestion liquor at such a rate that the total quantity of active sodium hydroxide in the digestion vessel at any time never exceeds about .1% of the weight of the digestion liquor, it is to be understood that I have operated the examples above-described so that the quantity of active sodium hydroxide does not exceed about .03 to .09%, and find that about .06% is preferable. Also, while I have indicated in Example 2, for instance, that the total quantity of active sodium hydroxide in the digestion vessel at any time never exceeds about .2% of the digestion liquor, I have worked the above examples with .11% to about .2%, and find that about .12% is preferable.

While I have referred above particularly to the preservation of the cellulose of the pith and its recovery substantially completely in undergraded condition, it is, of course, understood that the cellulose of the fiber bundles is, likewise, recovered in similar condition. As will be observed, the invention selectively solubilizes the ligneous encrustations by a process of producing pulps from pith-containing fibrous plant materials comprising digesting the material in hot alkaline liquor containing caustic soda in a concentration at all times sufficient to solubilize the ligneous content of the pulp, but never in a concentration high enough to substantially degrade, by chemical attack, the cellulose content and particularly that in the pith portion, the process being carried out with consumption of at least 4% and not exceeding about 25% caustic based on the weight of the pith-containing material and under temperature conditions from approximately the boiling point of the digestion liquor at atmospheric pressure to about 338° F.

EXAMPLES OF LIME DIGESTION

Example 8

Fifteen pounds of dry bagasse are placed in a rotary digester of 30 gallons liquid capacity. Seventy-five pounds of water previously adjusted to about pH 9.0 with lime is added, the digester is sealed and rotation started. Steam is admitted to the interior of the digester until the pressure reaches 50 pounds per square inch gauge, with great care being taken to bleed off air and dissolved gases, to bring the temperature to approximately 295° F. This pressure and temperature are maintained throughout the digestion. At one-half hour intervals, a sample of the cook liquor is withdrawn and its pH value determined, i. e., at room temperature. During this period, the pH value will ordinarily have decreased to approximately 7.5. Sufficient lime, in water suspension, is added to restore the pH value to approximately 8.5. This process is continued for three hours, or until a total of 300 grams dry calcium hydroxide (4.5%) has been consumed. At the end of this time, the digester is blown down to zero pressure and the pulped bagasse discharged. The pulp is washed and beaten or refined by any of the well known methods, and is then ready for use in the formation of wall board or pressed board. The yield of dry pulp will approximate 80% of the weight of original dry bagasse.

Where continuous sampling and pH control are provided, the pH remains substantially constant at a selected value for which the equipment is set, namely, between about 7.5 and 9.0, e. g., 8.5, until digestion is completed.

Use of a stationary digester, as described, allows greater capacity per unit volume and consequently, a higher rate of production of pulp.

While the specific example given above is for sugar can bagasse, I do not wish to be limited to bagasse alone as this process can be applied to cornstalks and similar pith-containing plant materials without any or with only very minor changes. It should be obvious to those skilled in the art that the degree of pulping may be increased or decreased by the use of more or less total lime in the process and that at these low ranges of pH a slight variation up or down the pH scale will only slightly affect the final product.

The broad concept of this invention embraces a process of producing pulp from pith-containing plant materials, such as bagasse, wherein said plant materials are digested with lime at pH values low enough to prevent reaction of the lime with cellulose and yet high enough to promote its combination with ligneous material. Therefore, I do not wish to be limited in the scope of this invention to the exact conditions given in the above example, except as hereinafter set forth in the claims. For instance, the digestion with lime wherein the pulping liquor is maintained at a pH between about 7.5 and 9.0 has been successfully carried out at a temperature between about 239° F. and 338° F. corresponding to a gauge pressure between about 10 pounds per square inch gauge and 100 pounds per square inch gauge, in accordance with the foregoing example.

COMBINED LIME AND SODIUM HYDROXIDE DIGESTION PROCESS

As stated above, suitable pulps which may be bleached or unbleached, may be produced for the manufacture of papers, boards and other cellulosic products, by a combination of the caustic soda and lime digestion treatments. Any of the aforesaid sodium hydroxide digestion treatments may be combined with the lime digestion treatments providing the critical conditions described in connection with each are maintained. Specifically, the critical features include, on the one hand, a lime digestion at a temperature up to about 338° F., preferably, between 239° F. and 338° F., maintaining the lime concentration to give a pH within the range of about 7.5 to 9.0 and the use of a total quantity of lime of from about 3% to about 25% by weight of the original plant material and, on the other hand, a caustic alkali digestion at a temperature up to about 338° F., preferably between the boiling point of the digestion liquor at atmospheric pressure and about 338° F., maintaining the sodium hydroxide at concentrations of 0.2% or less, preferably 0.1%, and still more preferably, not above about 0.06% of the weight of the digestion liquor, until an amount of sodium hydroxide is consumed equal to at least about 4%, preferably at least about 7.5% of the weight of the plant material, and not more than about 25% of the sodium hydroxide. The following example is illustrative of this process using the combined lime digestion and sodium hydroxide digestion treatments and preferably the lime digestion precedes the sodium hydroxide digestion.

Example 9

The process of Example 8 is carried out for about three or four hours or until a total of about 300 grams dry calcium hydroxide has been consumed. At this time, the internal pressure is reduced to 10 lb. gauge, corresponding to approximately 240° F., and addition of 10% sodium hydroxide, of 10 to 50% concentration, preferably about 40%, is begun by means of a suitable pump at a rate sufficient to maintain the concentration of active sodium hydroxide present in the digester at approximately 0.06% of the liquid at all times and not greater than about .1% of the weight of the cooking liquor. Control of the process is best accomplished by means of conductometric titration of samples of cook liquor withdrawn at intervals. With experience, the rate of addition of sodium hydroxide to a given digester is easily controlled. Digestion at the specified conditions of pressure and temperature is continued until a total of about 1.1 pounds of sodium hydroxide, 7.33% based on original bagasse, has been added. The addition of sodium hydroxide solution is then stopped and digestion continued for thirty minutes. At the end of this time, the pulp is discharged from the digester, washed and, if desired, bleached. The yield of bleached pulp is from 48 to 52% of the weight of original bagasse and chlorine consumption in bleaching averages 4.5% of the weight of unbleached pulp.

The broad concept of this invention embraces a process of preparing bleachable pulp from pith-containing fibrous plant materials which comprises digesting the plant materials in a controlled manner such that the cellulose from the pith is not destroyed.

Example 10

Alpha pulp was prepared by first the step of dry separation of pith and fibers in the usual manner. Then the bagasse chips were treated in a closed vessel with steam at 100 pounds pressure to distill off vaporizable materials. The steam pressure may vary between 100 and 120 pounds and the tempertaure may vary between 320° and 380° F. and higher, but 335° F. is preferred. During the steam treatment, the vessel may be partially or totally vented to let off the volatiles. The pulp at the end of this treatment, namely, when substantially all of the volatiles have been removed is removed from the vessel and further treated, or subsequently treated further therein, in accordance with each or any of the above examples. That is, the pulp is more easily digested by the soda process or the processes of this invention.

Example 11

Pulp from the previous example was cooked for one hour at 100 pounds' (gauge) steam pressure and at 327° F. in the presence of 2%, 3% and up to 8% sodium hydroxide based on the weight of the fiber. The results were not as satisfactory as where the previous examples, namely, Examples 1 and 2, were used in treating the pulp of Example 10, i. e., the yield and quality were reduced in accordance with the greater the quantity of sodium hydroxide employed.

*Example 12*

In this example the bagasse is hydrolyzed by adding 7 to 8 parts water to 1 part bagasse in closed vessel or digester and the mass is kept continuously under about 100 pounds' (gauge) steam pressure for about 1 hour. This hydrolysis step may include sulfuric acid or hydrochloric acid to accomplish the hydrolysis in the well known manner. As understood, the hydrolysis with steam with or without acid addition under pressure serves to heat the mass, and upon completion of the hydrolysis, the mass is blown out of the vessel by the pressure in the vessel and into a tower located conveniently to the pulp-forming apparatus. Since as much as 20% condensed water is produced by the hydrolysis, this is suitably drained off and the pulp is rinsed with clear water while travelling on an open work conveyor. Also, while so travelling on the conveyor, the pulp is rinsed with sodium hydroxide solution and black liquor or black liquor containing sodium hydroxide and the rinsed pulp is carried to a digester any of the procedures described above are performed as in the various examples.

In the present example, the pulp in the digester is mixed with black liquor in the ratio of 8 parts liquor to 1 part of bagasse by weight and caustic soda solution in amount of 22 to 23% sodium hydroxide concentration is fed in at a constant rate equal to about 2.15% of the weight of the original bagasse until a total of 8.6% caustic has been added based on the weight of the original bagasse. The temperature was varied between about 235° F. and 240° F., the latter being preferred, and digestion was carried out under a pressure of about 12 pounds per square inch for about 4 hours at which time a total of about 8.6% caustic had been added.

There was then added about 6.4% caustic based on the weight of the original bagasse, preferably at one time, and the steam pressure (gauge) raised to about 30 pounds per square inch and the temperature raised to about 274° F. and the pulp cooked for about one hour under these conditions.

Thereafter, the steam pressure (gauge) is raised to 50 pounds per square inch with live steam and the digester contents, i. e., the pulp, is blown out under this pressure whereupon the pulp is washed, screened and, if desired, bleached in the usual manner.

In connection with the pre-hydrolysis as described above, which may be accomplished with steam or acid, or both, as set forth, in the usual manner, the hydrolysis speeds up the softening of the bagasse and reduces the amount of caustic required. The hydrolysis, when conducted upon fresh cane bagasse, is usually done with acid to be sure to remove any sugar since the presence of the latter in many instances is objectionable.

In the operation of this invention, wherever caustic soda digestion is employed, as in the above examples, the preferred procedure from the standpoint of yield, quality and uniform control is to keep the caustic content at not more than about 0.2% based on the weight of the original bagasse until the fibers are softened and opened, i. e., feed the sodium hydroxide at a rate to maintain this condition (of not more than about .2% caustic) constant. Thereafter, the sodium hydroxide may be added as fast as desired, but realizing that by increasing the rate of feed there will be caused some sacrifice and loss of both yield and desirable properties. In brief, a cook of suitable length, e. g., 4 hours with the caustic constantly present in amount not greater than about 0.2% until the fibers are opened up is a preferable procedure and critical discovery for the production of the best pulp for the most exacting products. After the fibers are opened up, the sodium hydroxide can be added as desired but with the understanding that a departure from the examples necessarily because of increased sodium hydroxide present, speeds up the digestion and simultaneously reduces yield and properties.

*Example 13*

Thus, the invention was successfully operated carrying out the digestion as described in any of the foregoing examples and description wherein during the first stage, the caustic never exceeded 0.2% based on the weight of the original bagasse until the fibers opened up, e. g., for 4 hours, whereupon the digestion was continued by adding about 6.4% of caustic soda at one time, to produce the desired pulp.

While I have referred to 6.4% added caustic in the second stage, a greater or lesser amount may be added either at one time or over an extended period of time.

In carrying out the processes described herein, the examples, except as indicated, did not utilize any dry separation of the pith from the fibers, although in some cases, this could be a part of the several examples, using initially suitable refining equipment for the fibers, notably, the long bagasse fibers. I prefer not to separate the pith from the fibers because, as indicated, improved results are obtained where the pith is not separated from the fibers, as was heretofore customary.

In the present invention, the process provides for the pith cells uncurling into short fibers, i. e., straighten out, which fibers bind the fibers in the felted web while the lignin within the pith and fiber fractions are dissolving. Thus, the invention comprises pulp and pulp products, e. g., paper, board, etc., of delignified bagasse from whole or unseparated pulp including cellulose from the pith and fiber fractions. In brief, the pulp obtained is from the whole bagasse in which there has been no separation of pith and fiber, and in which the whole pulp, including the fiber and pith fractions, are delignified without degradation of the original cellulose in the pith and fiber portions.

This invention has been carried out as indicated previously using fresh cane bagasse. In such case, the examples and teachings described above are followed but the fresh bagasse is preferably first given an acid hydrolysis, as described heretofore, in the usual manner to be certain that any residual sugar is removed prior to digestion. Here again, there is no separation of the pith and fiber, the pulp consisting of these portions delignified in the whole bagasse, as stated.

The pulps prepared according to this invention are sometimes mixed with other pulps. For instance, sulfate or kraft pulp mixed with the bagasse pulps of this disclosure give improved fold and tear strength. The inclusion of sulfite pulp in addition, improves tensile strength. The inclusion of ground wood, in addition, acts to prevent wet breaks.

*Example 14*

60 parts sulfate pulp were mixed with 40 parts bagasse pulps prepared by each of Examples 1 to 13, respectively. The mixture was formed into a satisfactory printing paper.

*Example 15*

40 parts sulfate pulp were mixed with 60 parts bagasse pulps prepared by each of Examples 1 to 13, respectively. The mixture was formed into a satisfactory printing paper.

*Example 16*

60 parts sulfite pulp were mixed with 40 parts bagasse pulps prepared by each of Examples 1 to 13, respectively. The mixture was formed into a satisfactory printing paper.

Example 17

40 parts sulfite pulp were mixed with 60 parts bagasse pulps prepared by each of Examples 1 to 13, respectively. The mixture was formed into a satisfactory printing paper.

Example 18

60 parts ground wood pulp were mixed with 40 parts bagasse pulps prepared by each of Examples 1 to 13, respectively. The mixture was formed into a satisfactory printing paper.

Example 19

40 parts ground wood pulp were mixed with 60 parts bagasse pulps prepared by each of Examples 1 to 13, respectively. The mixture was formed into a satisfactory printing paper.

Some pulp mixtures were made up including bagasse, sulfate, sulfite and ground wood pulps in varying proportions and showed improved fold, tear and tensile strength and wet break resistance.

Example 20

This pulp mixture was composed of 40 parts bagasse, 40 parts sulfate and 20 parts sulfite pulps and was formed into a suitable printing paper.

Example 21

This product was identical to Example 20 except that part of the sulfite pulp was substituted by 10 parts ground wood pulp.

The proportions and constituents may be widely varied to improve the properties of the paper or board as indicated above. In all cases, the product was formed of delignified whole bagasse pulp which included the cellulose from the pith and fiber fractions in substantially undegraded condition, as above-described. The bagasse pulp was made from dried bagasse as well as fresh bagasse, the latter having been acid hydrolyzed to remove objectionable sugar.

As stated above, with the present invention there is no need to initially separate the pith fraction from the bundles. Hence, the final pulp includes both the cellulose from the fibers and the pith. The latter is then in a condition and position such that it appears to form in effect a natural bond for the fibers of a paper web when the pulp is laid down as a felt on a Fourdrinier or cylinder paper-making machine.

I claim:

1. A process of producing cellulosic pulps from pith-containing fibrous plant material comprising partly digesting the material in hot alkaline liquor containing a member of the group consisting of caustic soda and lime and thereafter digesting the material with the other member of the group consisting of caustic soda and lime, the digestion with lime being done with sufficient lime to maintain the pH between about pH 7.5 to pH 9 measured at room temperature and pressure which are low enough to prevent reaction of the lime with cellulose and high enough to promote its combination with ligneous material, the digestion with lime being continued until about 3% to about 8% of lime by weight of the plant material has been consumed and the digestion with caustic soda being carried out until between about 4% and about 25% sodium hydroxide, based on the weight of the plant material, is consumed, said concentration of caustic soda being never greater than about 0.2%, based on the weight of the digestion liquor, the temperature of digestion not exceeding about 338° F. in both the lime digestion and the sodium hydroxide digestion.

2. The process of claim 1, wherein the plant material is bagasse, the lime digestion is carried out at a temperature of about 239° F. and 338° F., the caustic soda digestion is performed at between about the boiling point of the liquor at atmospheric pressure and about 338° F., and the lime digestion precedes the caustic soda digestion.

3. The process of claim 2, wherein the concentration of caustic soda is never greater than about 0.1%.

4. The process of claim 2, wherein the concentration of caustic soda is not greater than about 0.1% until about 7.5% of the caustic soda is consumed and thereafter the concentration of caustic soda is not greater than about 0.2%.

5. The process of claim 2, wherein the concentration of caustic soda is never greater than about 0.06%.

6. The process of claim 1, in which the plant material is bagasse which has been preliminarily hydrolyzed to produce a resulting pulp rich in alpha-cellulose.

7. A process as recited in claim 1 in which the pith-containing fibrous plant material being digested has been preliminarily hydrolyzed to produce a resulting pulp rich in alpha-cellulose.

8. A process of producing bleachable pulps from pith-containing fibrous plant materials which comprises digesting the pith-containing fibrous plant material at a pressure of 50 pounds per square inch and a temperature of 295° F. with five times its weight of lime-water suspension in which the pH value is constantly maintained at 7.5 to 9 for three hours or until a total of 4.5% dry calcium hydroxide based on the weight of original dry pith-containing fibrous plant material has been added, reducing the pressure to 10 pounds per square inch and the temperature to 240° F., and adding sodium hydroxide solution to the digester at a rate sufficient to maintain the concentration of active sodium hydroxide at substantially 0.06% of the liquid until a total quantity of dry sodium hydroxide equal to 7.33% of the weight of original dry pith-containing fibrous plant material has been added.

9. A process of producing cellulosic pulps from pith-containing fibrous plant material comprising partly digesting the material in hot alkaline liquor containing a member of the group consisting of caustic soda and lime and thereafter digesting the material with the other member of the group consisting of caustic soda and lime, the digestion with lime being done with sufficient lime to maintain the pH between about pH 7.5 to pH 9 measured at room temperature and pressure which are low enough to prevent reaction of the lime with cellulose and high enough to promote its combination with ligneous material, the digestion with lime being continued until about 3% to about 25% of lime by weight of the plant material has been consumed and the digestion with caustic soda being carried out until between about 4% and about 25% sodium hydroxide, based on the weight of the plant material is consumed, said concentration of caustic soda being never greater than about 0.2%, based on the weight of the digestion liquor, the temperature of digestion not exceeding about 338° F. in both the lime digestion and the sodium hydroxide digestion.

10. The process of claim 9, wherein the fibrous plant material is bagasse.

11. The process of claim 10, wherein the lime digestion precedes the caustic soda digestion.

12. The process of claim 11, wherein the temperature of the lime digestion is maintained between about 239° and 338° F. and the temperature of the caustic soda digestion is between about that at which the liquor boils at atmospheric pressure and about 338° F.

13. The process of claim 12, wherein the concentration of caustic soda is never greater than about 0.1%.

14. The process of claim 12, wherein the concentration of caustic soda is never greater than about 0.1% until about 7.5% of the caustic soda is consumed and thereafter the concentration of caustic soda is not greater than about 0.2%.

15. The process of claim 12, wherein the concentration of caustic soda is never greater than about 0.06% until about 7.5% of the caustic soda is consumed and thereafter the concentration of caustic soda is not greater than about 0.2%.

16. A process of producing pulp from bagasse wherein bagasse is digested with calcium hydroxide in water suspension at a pressure of fifty pounds per square inch while constantly maintaining the concentration of calcium hydroxide low enough to prevent its reaction with cellulose and high enough to promote its reaction with ligneous material by adding fresh calcium hydroxide at a rate sufficient to maintain the pH value of the cooking liquor constantly between 7.5 and 9 measured at room temperature and pressure until a total of 4.5% calcium hydroxide based on original bagasse has been added.

17. A process of producing pulp from pith-containing plant material consisting of digestion-resistant hard outer fiber bundles and more easily digested inner pith portions wherein such plant material is digested with calcium hydroxide in water suspension at a pressure of fifty pounds per square inch while constantly maintaining the concentration of calcium hydroxide low enough to prevent its reaction with cellulose and high enough to promote its reaction with ligneous material by adding fresh calcium hydroxide at a rate sufficient to maintain the pH value of the cooking liquor constantly between 7.5 and 9 measured at room temperature and pressure until a total of 4.5% calcium hydroxide based on original plant material has been added.

18. A process of producing pulp from bagasse wherein bagasse is digested with a water suspension of lime at constantly maintained lime concentrations to give a constant pH of about pH 7.5 to pH 9 measured at room temperature and pressure which are low enough to prevent reaction of the lime with cellulose and high enough to promote its combination with ligneous material, the digestion being continued until from about 3% to about 8% of lime by weight of the original bagasse has been consumed by heating at a temperature between about 239° F. and 338° F.

19. A process of producing pulp from bagasse wherein bagasse is digested with a water suspension of lime at constantly maintained lime concentrations to give a pH maintained between about pH 7.5 to pH 9 measured at room temperature and pressure which are low enough to prevent reaction of the lime with cellulose and high enough to promote its combination with ligneous material, the digestion being continued until from about 3% to about 8% of lime by weight of the original bagasse has been consumed, the digestion being carried out at a temperature between about 239° F. and 338° F.

20. A process of producing pulp from pith-containing plant material containing digestion resistant hard outer fiber bundles and more easily digested inner pith portions wherein such plant material is digested with a hot water suspension of lime at constantly maintained lime concentrations to give a pH maintained between about pH 7.5 to pH 9 measured at room temperature and pressure which are low enough to prevent reaction of the lime with cellulose and high enough to promote its combination with ligneous material, the digestion being continued until about 3% to about 25% of lime by weight of the plant material has been consumed at a temperature up to about 338° F.

21. The process of claim 20, in which the plant material is bagasse.

22. A process of producing pulp from pith-containing plant material containing digestion resistant hard outer fiber bundles and more easily digested inner pith portions wherein such plant material is digested with a hot water suspension of lime at constantly maintained lime concentrations to give a pH maintained between about pH 7.5 to pH 9 measured at room temperature and pressure which are low enough to prevent reaction of the lime with cellulose and high enough to promote its combination with ligneous material, the digestion being continued until about 3% to about 25% of lime by weight of the plant material has been consumed at a temperature between about 239° F. and about 338° F.

23. The process of claim 22, wherein the plant material is bagasse.

24. A process of producing pulp from pith-containing plant material containing digestion resistant hard outer fiber bundles and more easily digested inner pith portions wherein such plant material is digested with a hot water suspension of lime at constantly maintained lime concentrations to give a pH maintained between about pH 7.5 to pH 9 measured at room temperature and pressure which are low enough to prevent reaction of the lime with cellulose and high enough to promote its combination with ligneous material, the digestion being continued until about 3% to about 8% of lime by weight of the plant material has been consumed at a temperature between about 239° F. and 338° F.

25. A process of producing pulps from pith-containing fibrous plant materials comprising digesting the material in hot alkaline liquor containing caustic soda in a concentration at all times sufficient to solubilize the ligneous content of the pulp but never in concentration to substantially degrade, by chemical attack, the cellulose content including that in the pith portion, the digestion being carried out until between about 4% and 25% sodium hydroxide based on the weight of the plant material is consumed, the temperature of the digestion liquor being in the range from substantially that at which the liquor boils at atmospheric pressure to 338° F., said concentration of sodium hydroxide being never greater than about .2% based on the weight of the digestion liquor.

26. A process of producing pulps from pith-containing fibrous plant materials comprising digesting the material is hot alkaline liquor containing caustic soda in a concentration at all times sufficient to solubilize the ligneous content of the pulp but never in concentration to substantially degrade, by chemical attack, the cellulose content including that in the pith portion, the digestion being carried out until between about 4% and about 25% sodium hydroxide, based on the weight of the plant material, is consumed, said concentration of caustic soda being never greater than about 0.2%, based on the weight of the digestion liquor, the temperature of digestion not exceeding about 338° F.

27. A process of producing pulps from pith-containing fibrous plant materials comprising digesting the material in hot alkaline liquor containing caustic soda in a concentration at all times sufficient to solubilize the ligneous content of the pulp but never in concentration to substantially degrade, by chemical attack, the cellulose content including that in the pith portion, the digestion being carried out until between about 4% and about 25% sodium hydroxide, based on the weight of the plant material, is consumed, said concentration of caustic soda being never greater than about 0.1%, based on the weight of the digestion liquor, the temperature of digestion not exceeding about 338° F.

28. A process of producing pulps from pith-containing fibrous plant materials comprising digesting the material in hot alkaline liquor containing caustic soda in a concentration at all times sufficient to solubilize the ligneous content of the pulp but never in concentration to substantially degrade, by chemical attack, the cellulose content including that in the pith portion, the digestion being carried out until between about 7.5% and about 25% sodium hydroxide, based on the weight of the plant material, is consumed, said concentration of caustic soda being never greater than about 0.1%, based on the weight of the digestion liquor, until about 7.5% of sodium hydroxide, based on the weight of the plant material, is consumed and thereafter continuing digestion with hot alkaline liquor, wherein sodium hydroxide is introduced into the digestion liquor at such a rate that the total quantity of active sodium hydroxide in the digestion vessel at no times exceeds about 0.2% of the digestion liquor, the temperature of digestion not exceeding about 338° F.

29. A process of producing pulps from pith-containing fibrous plant materials comprising digesting the material in hot alkaline liquor containing caustic soda in a concentration at all times sufficient to solubilize the ligneous content of the pulp but never in concentration to substantially degrade, by chemical attack, the cellulose content including that in the pith portion, the digestion being carried out until between about 4% and about 25% sodium hydroxide, based on the weight of the plant material is consumed, said concentration of caustic soda being never greater than about 0.1%, based on the weight of the digestion liquor, the temperature of digestion being within the range from about that at which the digestion liquor boils at atmospheric pressure to about 338° F.

30. A process of producing pulps from pith-containing fibrous plant materials comprising digesting the material in hot alkaline liquor containing caustic soda in a concentration at all times sufficient to solubilize the ligneous content of the pulp but never in concentration to substantially degrade, by chemical attack, the cellulose content including that in the pith portion, the digestion being carried out until between about 7.5% and about 25% sodium hydroxide, based on the weight of the plant material, is consumed, said concentration of caustic soda being never greater than about 0.1% based on the weight of the digestion liquor, until about 7.5% of sodium hydroxide, based on the weight of the plant material, is consumed and thereafter continuing digestion with hot alkaline liquor, wherein sodium hydroxide is introduced into the digestion liquor at such a rate that the total quantity of active sodium hydroxide in the digestion vessel at no time exceeds about 0.2% of digestion liquor, the temperature of digestion being within the range from about that at which the digestion liquor boils at atmospheric pressure to about 338° F.

31. A process of producing cellulose pulps from pith-containing fibrous plant materials without substantial degradation of the cellulose in the pith comprising hydrolyzing the fibrous material, digesting the hydrolyzed fibrous material in hot alkaline liquor containing caustic soda in a concentration at all times sufficient to solubilize the ligneous content of the pulp but never in concentration to substantially degrade, by chemical attack, the cellulose content including that in the pith portion, the digestion being carried out until between about 4% and about 25% sodium hydroxide, based on the weight of the plant material, is consumed, said concentration of caustic soda being never greater than about 0.1% based on the weight of the digestion liquor, until about 7.5% of sodium hydroxide, based on the weight of the plant material, is consumed and thereafter continuing digestion with hot alkaline liquor, wherein sodium hydroxide is introduced into the digestion liquor at such a rate that the total quantity of active sodium hydroxide in the digestion vessel at no times exceeds about 0.2% of the digestion liquor, the temperature of digestion not exceeding about 338° F.

32. The process of claim 25, wherein the pith-containing fibrous plant material is bagasse.

33. The process of claim 26, wherein the pith-containing fibrous plant material is bagasse.

34. The process of claim 27, wherein the pith-containing fibrous plant material is bagasse.

35. The process of claim 28, wherein the pith-containing fibrous plant material is bagasse.

36. The process of claim 29, wherein the pith-containing fibrous plant material is bagasse.

37. The process of claim 30, wherein the pith-containing fibrous plant material is bagasse.

38. The process of claim 31, wherein the pith-containing fibrous plant material is bagasse.

39. A process of producing pulps from pith-containing fibrous plant materials comprising digesting the material in hot alkaline liquor containing caustic soda in a concentration at all times sufficient to solubilize the ligneous content of the pulp but never in concentration to substantially degrade, by chemical attack, the cellulose content including that in the pith portion, the digestion being carried out until between about 7.5% and about 25% sodium hydroxide, based on the weight of the plant material, is consumed, said concentration of caustic soda being never greater than about 0.06%, based on the weight of the digestion liquor, the temperature of digestion being within the range from about that at which the digestion liquor boils at atmospheric pressure to about 338° F.

40. The process of claim 39, wherein the pith-containing fibrous plant material is bagasse.

41. A process according to claim 25 wherein the fibers are opened up and wherein the process is continued using greater concentrations of sodium hydroxide.

42. A process according to claim 41 wherein the greater concentration of sodium hydroxide is introduced to the pulp at one time.

References Cited in the file of this patent

UNITED STATES PATENTS

| Number | Name | Date |
|---|---|---|
| 27,507 | Allen | Mar. 20, 1860 |
| 811,419 | Manns | Jan. 30, 1906 |
| 1,151,490 | McRae | Aug. 24, 1915 |
| 1,235,220 | Marsden | July 31, 1917 |
| 1,319,360 | Rinman | Oct. 21, 1919 |
| 1,501,925 | Shaw | July 22, 1924 |
| 1,566,118 | Rawling | Dec. 15, 1925 |
| 1,630,147 | Valet | May 24, 1927 |
| 1,705,424 | Strecker | Mar. 12, 1929 |
| 1,728,258 | Sheperd | Sept. 17, 1929 |
| 1,792,009 | Hagglund | Feb. 10, 1931 |
| 1,819,194 | Munroe et al. | Aug. 18, 1931 |
| 1,845,488 | Darling | Feb. 16, 1932 |
| 1,922,262 | Ross | Aug. 15, 1933 |
| 1,932,904 | McKee | Oct. 31, 1933 |
| 1,935,728 | Richter | Nov. 21, 1933 |
| 1,941,350 | Hawerlander | Dec. 26, 1933 |
| 1,941,817 | Sweeney et al. | Jan. 2, 1934 |
| 1,949,669 | Wells | Mar. 6, 1934 |
| 1,958,376 | Ward | May 8, 1934 |
| 1,971,241 | Weitzel et al. | Aug. 21, 1934 |
| 2,078,222 | Altich | Apr. 27, 1937 |
| 2,169,473 | Olsen | Aug. 15, 1939 |
| 2,466,290 | Wells | Apr. 5, 1949 |

FOREIGN PATENTS

| Number | Country | Date |
|---|---|---|
| 101,715 | Australia | Aug. 12, 1937 |
| 265,697 | Great Britain | Feb. 14, 1929 |
| 526,636 | Great Britain | Sept. 23, 1940 |

OTHER REFERENCES

Jyme et al.: Chemical Abstracts, vol. 38, page 2488.

Boehm: Paper Trade Journal, May 2, 1940, pages 35–38.

Technical Assn. Papers, Series 27 (1944), pages 167–173.